United States Patent [19]
Peru

[11] Patent Number: 5,235,213
[45] Date of Patent: Aug. 10, 1993

[54] ELECTRICAL CONTROL SELECTOR FOR CONTROLLING AT LEAST ONE ACTUATOR BETWEEN A PLURALITY OF DISCRETE POSITIONS

[75] Inventor: Patrick Peru, Vert Saint Denis, France

[73] Assignee: Valeo Commutation, Paris, France

[21] Appl. No.: 871,180

[22] Filed: Apr. 20, 1992

[30] Foreign Application Priority Data

Apr. 26, 1991 [FR] France .................. 91 05163

[51] Int. Cl.$^5$ .................. B60Q 1/076; G05B 19/10
[52] U.S. Cl. .................. 307/10.8; 318/466; 318/673
[58] Field of Search .......... 318/673, 264, 265, 266, 318/286, 466, 467, 468; 307/9.1, 10.1, 10.8

[56] References Cited

U.S. PATENT DOCUMENTS

| | | |
|---|---|---|
| 3,722,984 | 3/1973 | Brean . |
| 3,903,429 | 9/1975 | Heffel . |
| 4,088,398 | 5/1978 | Zoursel . |
| 4,162,424 | 7/1979 | Zillgitt et al. . |
| 4,197,491 | 4/1980 | Cunnell et al. .......... 318/673 |
| 4,284,903 | 8/1981 | Mutschler et al. ......... 318/673 X |
| 4,533,860 | 8/1985 | Saito .................. 318/673 |
| 4,968,896 | 11/1990 | Shibata et al. .......... 307/10.8 |

FOREIGN PATENT DOCUMENTS

| | | |
|---|---|---|
| 0367668 | 5/1990 | European Pat. Off. . |
| 1453552 | 10/1965 | France . |
| 27563 | of 1913 | United Kingdom . |

OTHER PUBLICATIONS

DeLuca, Paul V., High Speed Rotary Switch, Jan. 1970, Instruments and Control Systems, vol. 43, No. 1, p. 24.

*Primary Examiner*—Bentsu Ro
*Attorney, Agent, or Firm*—Longacre & White

[57] ABSTRACT

A selector is typically arranged to control adjustment of a motor vehicle headlamp between a plurality of discrete, stable positions. It includes a control member arranged to occupy a number of discrete stable positions, a switching member operated by the control member, a voltage generator for giving voltage signals and having two supply inputs, a control output terminal for operating an actuator for the headlamp, and at least one coded network of resistors and electrical contact strips.

The output terminal is connected to each supply input through at least one resistor, the coded network comprising at least one collecting strip connected to the output terminal, together with a secondary contact strip, also connected to the output terminal, and a primary contact strip connected to one of the supply inputs. The various contact strips are so arranged that the switching member cooperates with the collecting strip in all of the positions, with the primary contact strip in a smaller number of positions, and with the secondary contact strip in an even smaller number of positions.

9 Claims, 3 Drawing Sheets

ELECTRICAL CONTROL SELECTOR FOR CONTROLLING AT LEAST ONE ACTUATOR BETWEEN A PLURALITY OF DISCRETE POSITIONS

FIELD OF THE INVENTION

The present invention is concerned with electrical control selectors for controlling at least one actuator for a member which is movable between a plurality of discrete positions, for example a headlamp or a pair of headlamps for a motor vehicle. In particular the invention is concerned with such a selector comprising a control member adapted to occupy a plurality of stable positions; a switching member which is movable under the action of the control member: a voltage generator for emitting voltages at discrete values and comprising two supply inputs each connected to a respective one of the terminals of an electrical supply source; a control output terminal for controlling the actuator; and, between the said supply inputs and the said output terminal, at least one coded network of electrical resistors and contact strips, with the said electrical contact strips being adapted to cooperate in a coded manner with the said switching member for emission of a command signal to the output terminal.

BACKGROUND OF THE INVENTION

A selector of this kind is described in the specification of published European patent application No. EP 0 367 668A, in which the actuator is a voltage responsive generator which is a "mirror image" of the above mentioned voltage generator, together with an electric motor which is powered through differential amplifiers of limited or fixed gain and mounted in opposition to each other. In addition, in the event of damage to the control line, the movable member assumes a predetermined position.

The selector or switching unit includes a switching member in the form of a conductive cursor for making electrical contact between one of the contact points (or electrical contact strips) and the control output terminal; the voltage generator for emitting voltages at a plurality of discrete values consists of a voltage splitting bridge with resistors.

This requires certain precautions to be taken. Thus, it is necessary for the cursor, while passing from one stable position to another, to overlie the contact strips unless this would produce, at the control output terminal, a signal equivalent to a fault in the control line, in which case the headlamp is automatically returned to its dipped position.

In addition, when two contact strips are connected to the supply inputs, it is necessary to prevent the cursor from overlying three contact strips at the same time when passing from one position to another. Accordingly, having regard to the mounting mentioned above, of the actuator (or positioning unit), the electric motor of the latter would oscillate. It is also desirable for standardization reasons to avoid having to modify the actuator, which is overall a more costly component than the selector.

DISCUSSION OF THE INVENTION

An object of the present invention is to satisfy the above criteria in a simple and economic manner, without having to modify the positioning unit.

In accordance with the invention, a selector of the kind described above is characterized in that the output terminal is connected to each of the supply inputs through at least one resistor, in that the said coded network of resistors and electrical contact strips comprises: at least one collecting strip connected to the output terminal, a secondary contact strip connected to the output terminal; and a primary contact strip connected to one of the said supply inputs, and in that the said electrical contact strips are so arranged and dimensioned that the switching member is in permanent cooperation with the collecting strip, while the switching member cooperates with the primary contact strip in a number of the said positions smaller than the total number of positions, and with the secondary contact strip in an even smaller number of the said positions.

The invention enables the switching member, which is for example again a cursor, to separate from one contact strip on each change of position without leading to any instability in the actuator, due mainly to the fact that the collecting contact strip and the secondary contact strip or strips are connected to the control output terminal.

It will be appreciated that this arrangement is economical in cost and leads to minimal modification. In addition, it is possible to provide an increased number of stable positions, by providing a second series of secondary contact strips, longer than the first series of secondary contact strips but shorter than the primary contact strip.

It is also easy to provide an increased number of positions by using a symmetrical arrangement in which a second primary contact strip is connected to the other supply input and to a second secondary contact strip connected to the first secondary contact strip. An appropriate resistor is associated with each contact strip, depending on the particular application. In a modification, the various contact strips could be made with different electrical resistances.

It will be appreciated that a resistor is brought into or out of circuit as between one of the said positions and another, which enables the selector to be easily matched to a standard actuator.

A preferred embodiment of the invention is described below, by way of example only and with reference to the accompanying drawings.

DESCRIPTION OF A PREFERRED EMBODIMENT OF THE INVENTION

Figure 1:
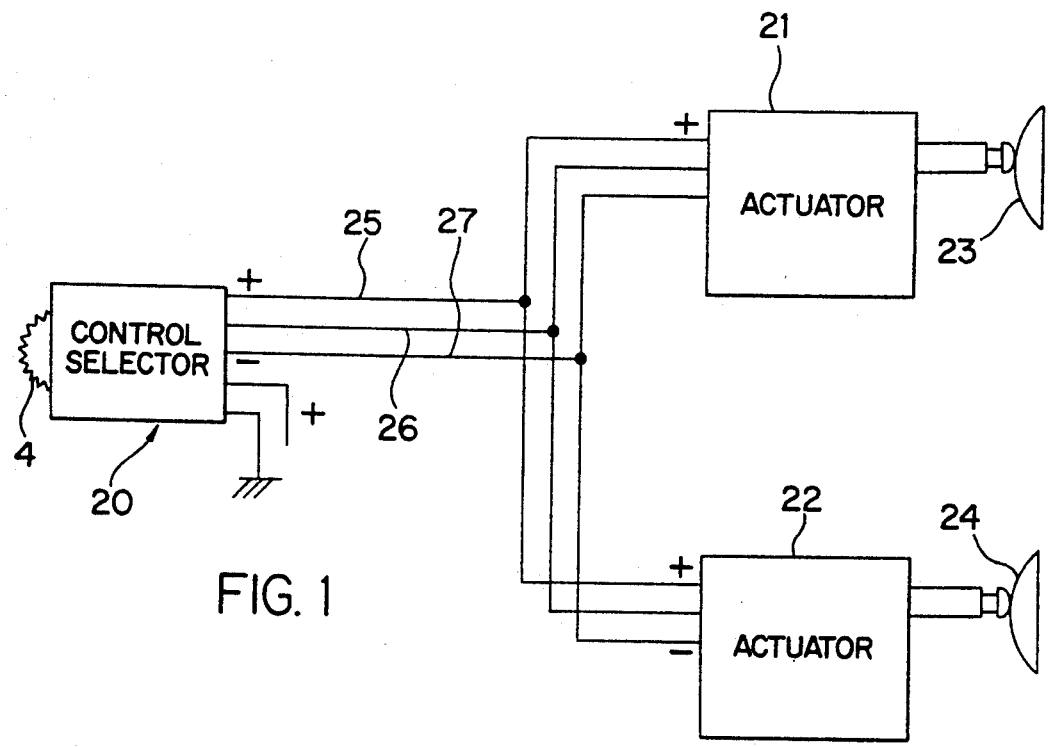
FIG. 1 is a diagrammatic view of a selector in accordance with the invention, associated with two actuators.
Figure 2:
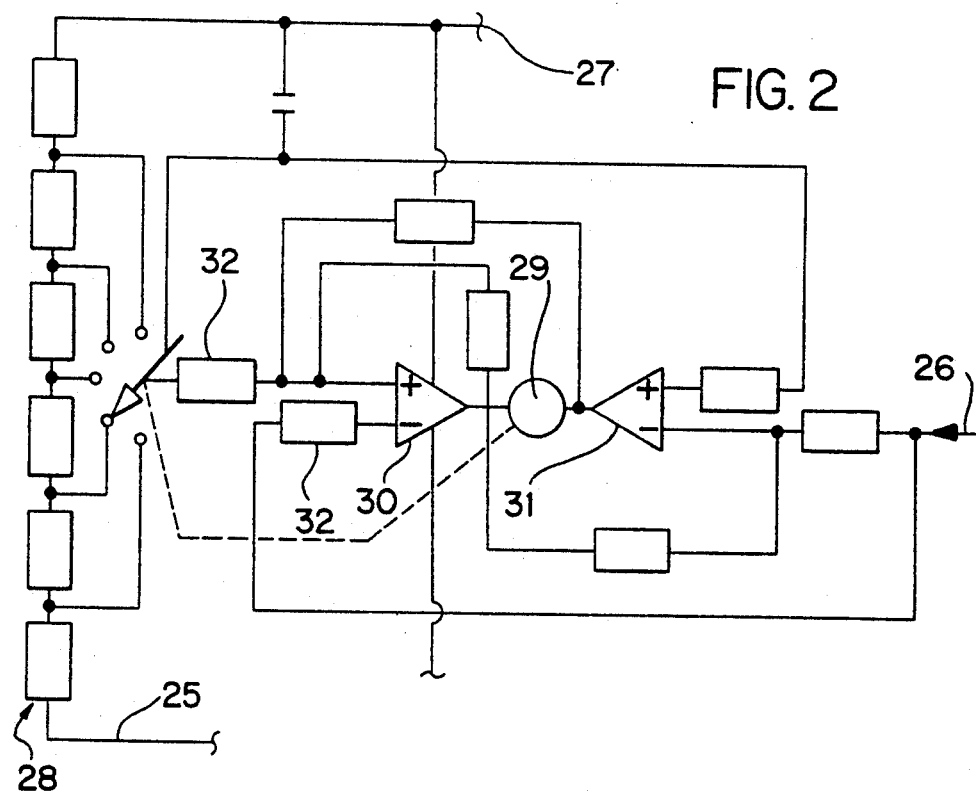
FIG. 2 is a view of part of the electronic circuit of one actuator.

In the drawings, the electrical control selector 20 is intended for controlling the action of at least one actuator 21, 22 of a movable member 23, 24 which is displaceable between a number of discrete positions. The selector 20 includes a control member 4 which is adapted to occupy a plurality of stable positions, together with: a movable switching member 11, movable under the action of the control member 4; a voltage generator 50 for emitting voltages at discrete values and having two supply inputs 58, 59, which are connected to respective ones of the terminals of an electrical supply source; a control output terminal 56 for control of the actuator; and, between the supply inlets 58, 59 and the output terminal 56, at least one coded network comprising a plurality of resistors R1 to R6 and electrical contact strips 51 to 55. These contact strips 51 to 55 are arranged to cooperate in a coded manner with the switching member 11, such that a command signal is given at the output terminal 56.

In this example, the selector 20 is connected through three lines 25 to 27 to two actuators 21, 22 for controlling the headlamps 23, 24 of a motor vehicle. The selector is supplied with power from the battery of the motor vehicle, which constitutes the above mentioned electrical supply source. Its inputs 58, 59 are connected respectively to the negative terminal of the battery (which is earthed to the vehicle) and to the positive terminal of the battery at +12 V.

The actuators 21 and 22 are constructed in the manner described in the above mentioned European published patent specification No. EP 0 367 668A, and include a voltage responsive generator 28 comprising a plurality of resistors, together with an electric motor 29 and two differential amplifiers 30 and 31 which are mounted in opposition to each other, with resistors 32 being interposed.

The line 25 is connected to the positive terminal of the vehicle battery, while the line 27 is earthed to the vehicle, the line 26 constituting the control line. Each actuator 21, 22 may of course be supplied directly from the vehicle battery, so that it is not then essential to provide the lines 25 and 27.

The control output terminal 56 is connected to each of the supply inputs 58 and 59 through at least one resistor R2, R1. The coded resistor network R1 to R5 and electrical contact strips 51 to 55 include at least one collecting strip 51 which is connected to the control output terminal 56, together with a secondary supply strip 52, 55 connected to the output terminal 56 and a primary supply strip 53, 54 connected to one of the supply terminals 58, 59. The electrical contact strips 51 to 55 are so made and dimensioned that the switching member 11 is in permanent cooperation with the collecting strip 51, while it is in contact with the primary supply strip 53, 54 in a smaller number of positions, and with the secondary supply strip 52, 55 in an even smaller number of positions.

Figure 5:
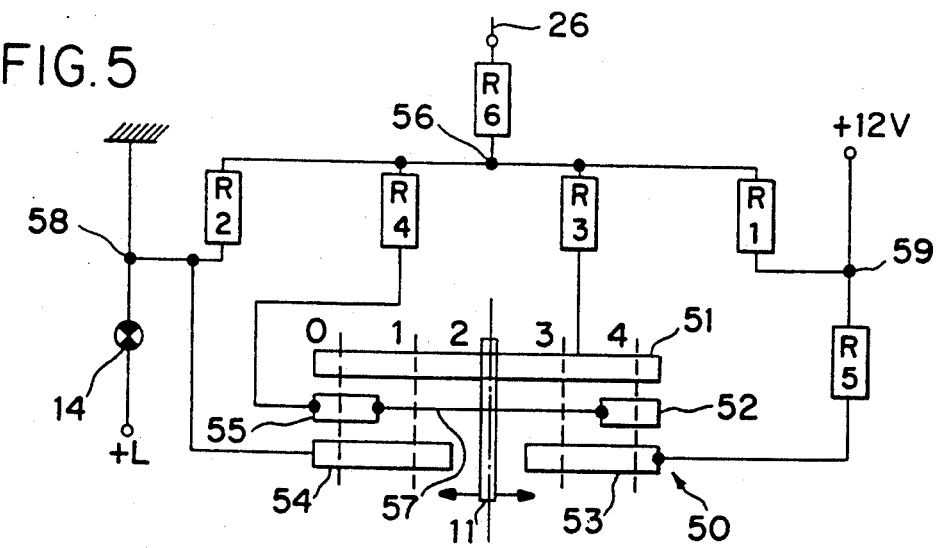
FIG. 5 is a diagrammatic view of the electrical circuit of the selector.

In the particular arrangement shown in the drawings, the selector is arranged to adopt five stable positions (like the actuator), which are indicated by the reference numerals 0 to 4 in FIG. 5. The arrangement is symmetrical about the middle position 2. The primary supply strips, secondary supply strips and collecting strips are all parallel to each other.

More precisely, there are in this example two primary supply strips 53 and 54, two secondary supply strips 52 and 55 which are connected together through a conductive line 57, and a single collecting strip 51. The latter is connected through a resistor R3 to the output terminal 56, while the secondary supply strips 52 and 55 are connected to the output terminal 56 through a further resistor R4. The contact strip 54 is connected to the supply terminal 58 (i.e. earth or ground) and to a resistor R2, while the primary supply strip 53 is connected to the input 59, at 12 V, through a resistor R5. The output terminal 56 is connected to ground and to the input 58 through the resistor R2, and to the input 59 through the resistor R5. The strips extend parallel to each other.

The switching member 11 comprises a cursor which is displaceable axially and which is in the form of a three-pronged comb adapted to cooperate with the electrical contact strips in a manner to be described below. The cursor 11 is of an electrically conductive material, and in this example is of metal. It is fixed to a carriage 10 which is itself movable axially. The carriage 10 is generally in the form of an angle piece comprising a tubular upper portion having a threaded internal bore for cooperation with a thread 12 formed on the outer periphery of the control member 4.

The control member 4 is a small toothed wheel which has a tubular portion on which the external thread 12 is formed. The wheel 4 is mounted for rotation about a spindle 9, and is fixed to an insert 5 which carries marks to indicate the five stable positions of the wheel 4.

The primary supply contact strip or strips are offset axially with respect to the secondary contact strip or strips, the latter being themselves offset axially with respect to the single collecting strip. In this example, the primary contact strips 53 and 54 are arranged as axial extensions of each other, as are the secondary contact strips 52 and 55, and extend parallel to the collecting strip 51 and to the secondary strips 52 and 55. The primary contact strips 53 and 54 are longer in the axial direction than the secondary contact strips 52 and 55, but are shorter in the axial direction than the collecting strip 51. The length of the latter is equal to the total length of the primary strips 53 and 54, which are separated from each other by a non-conducting zone so as to define the middle position.

The generator 50 is carried by a support plate 3 of electrically insulating material. The cursor 11 is arranged to cooperate with the resistive network. All these components are mounted inside a housing 1, 2, which is of an electrically insulating material which in this example is a plastics material. The housing 1, 2 comprises a base member 1 having a base portion which is constructed as an electrical connector and which is shrouded by a cover member 2 which is attached to the base member 1 by a snap-fit or clipping attachment. A hooking lug which is fixed to the cover member 2 can be seen in the lower part of FIG. 4, as can a tongue which is fixed to the base member 1. The housing is assembled in a known way by resilient engagement of the tongue so that the hooked lug hooks against a fixed abutment of the base member 1, which serves as a guide for the carriage 10. In a modification, fitting of the two components of the housing together may be obtained by threaded attachment or by adhesion.

Figure 3:
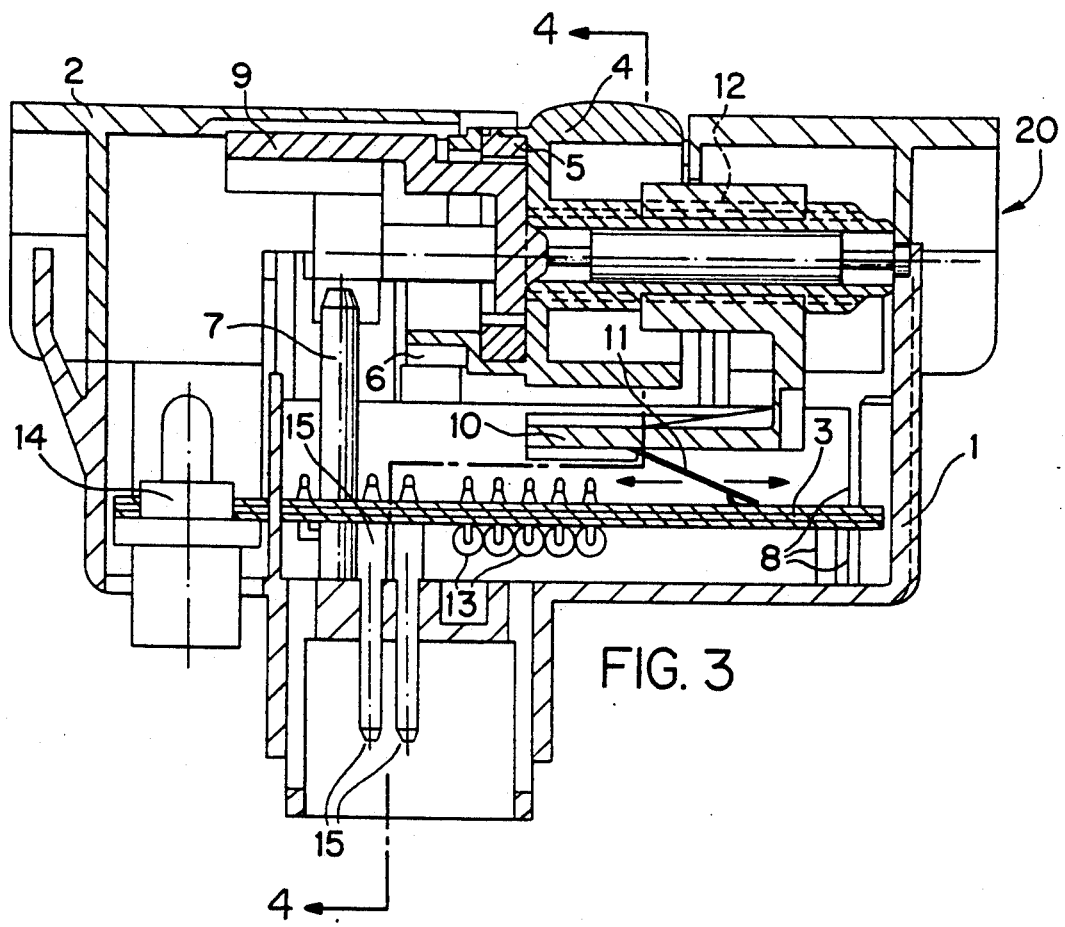
FIG. 3 is a view in axial cross section showing a selector in accordance with the invention.

The housing 1, 2 also includes lugs, one of which can be seen in the left hand part of FIG. 3, for mounting on the bulkhead of the vehicle. The cover member 2 is suitably styled, and has an opening 17 for access to the wheel 4 so that the latter can be actuated by the user.

The stable positions of the wheel 4 are obtained by virtue of disengageable locking means, which in this example comprise teeth 6 formed in the wheel 4, together with a resilient locking member 16 carried by the base member 1. This locking member is in the form of a thin metal strip cooperating with the teeth 6. Movement from one stable position to another is obtained by rotating the wheel 4 and disengaging the strip 16, followed by engagement of the latter with a further tooth 6. In a modification, an arrangement can of course be used in which a spring-mounted pin is used for cooperation with the teeth 6.

Figure 4:
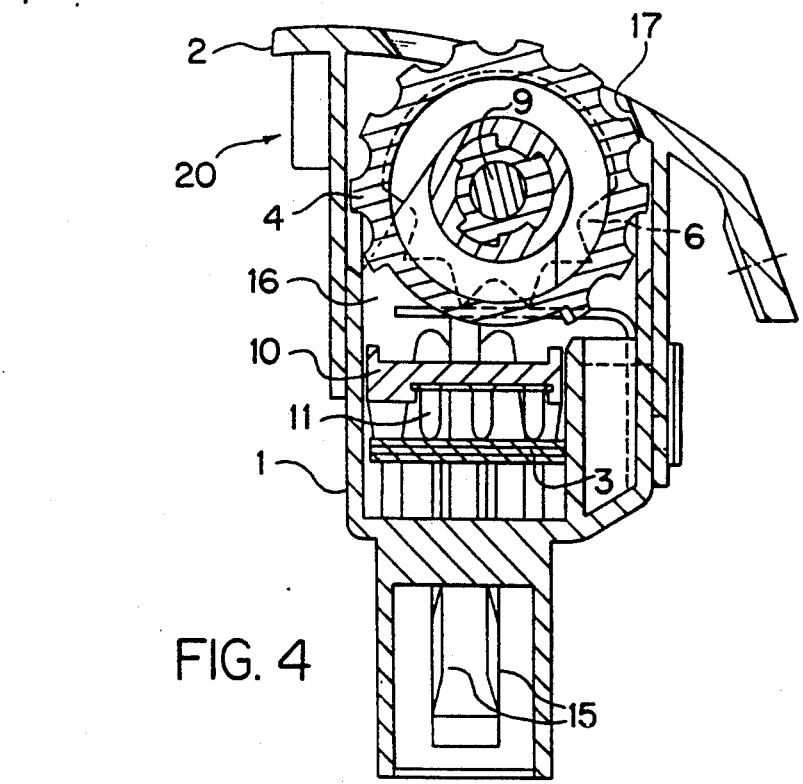
FIG. 4 is a view in cross section taken on the line 4—4 in FIG. 3

In this example the spindle 9 is carried by the cover member 2, and has a thickened portion for mating cooperation with the internal bore of the wheel 4 and for coupling with the latter in rotation, as can be seen in FIG. 4.

Figure 6:
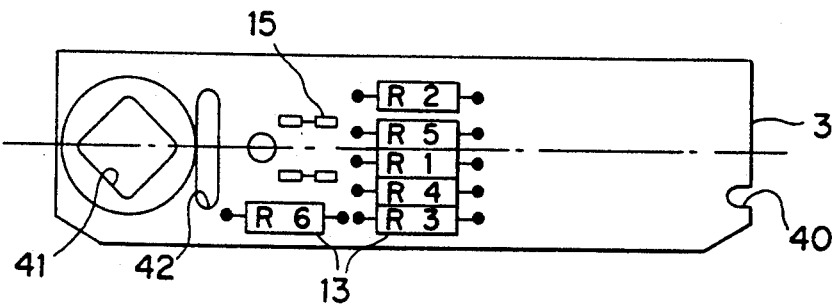
FIG. 6 is an inverted plan view on the support plate of the electrical circuit of the selector.

The support plate 3 carries pins 15 on one of its faces. The pins 15 extend through the base portion of the base member 1 and are part of the electrical connector of the latter. It also carries, on the same face, resistors 13 which are part of the coded network mentioned above. The electrical contact strips 51 to 55 are arranged on the other face of the insulating support plate 3. The latter carries a lamp 14, and also carries the electrical supply means for this lamp. The lamp 14 illuminates the insert 5, which is of translucent material, and the lamp 14 is accessible from outside. The base portion 1 carries a finger 7 which extends through a hole 42 formed in the support plate 3 (see FIG. 6), so as to secure the support plate in position and to support the spindle 9. The support plate 3 is also formed with a notch 40, through which there extends a projection which is part of a series of projections 8 for supporting and locating the support plate 3. The lamp 14 is mounted in an aperture 41 in the plate 3.

The carriage 10 has a horizontal lower portion which extends below the wheel 4 and carries the cursor 11 for cooperation with the contact strip. In this example the cursor 11 has three prongs. The device operates by covering an uncovering the contact strips.

The resistors R1 to R5 have values of resistance which depend on the particular application, and a resistor R6 is provided at the output terminal 56. This resistor R6 is a safety resistor. In this example the resistors R1 to R6 have different values of resistance. Thus, for example, movement from the middle position 2 to the position 1 is obtained by rotation of the wheel 4 from one tooth to the other, the motion of the wheel being converted into axial displacement of the carriage 10 by the threaded coupling with the thread 12, so that the carriage displaces the cursor 11 axially and is guided axially by the side walls of the base portion 1 of the housing (see FIG. 4). During this phase, the cursor 11, which was initially in contact only with the collecting strip 51, comes into contact with the strip 54 and so connects these two strips together. If the movement is now continued (i.e. from position 1 to position 0), the cursor 11 comes into contact with the secondary contact strip 55, so as to connect the three strips 51, 54 and 55 electrically together.

It is of course also possible to move the wheel 4 in the opposite direction, so as to go from position 2 to position 3, so that it covers the secondary strip 52 which is connected to the strip 55 through the line 57, and vice versa.

Figure 7:
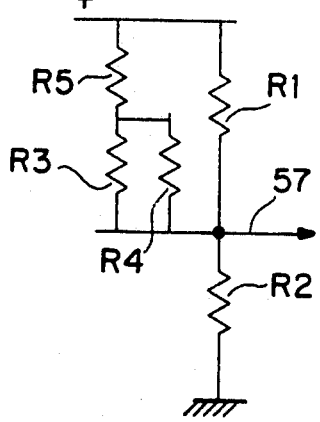
FIGS. 7 to 11 are diagrammatic views showing the value of the resistances for various stable positions of the selector.
Figure 8:
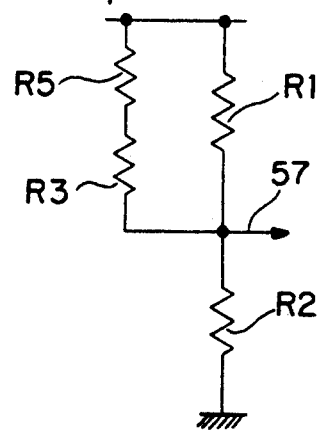
Figure 9:
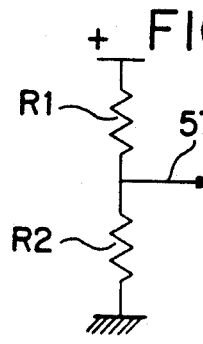
Figure 10:
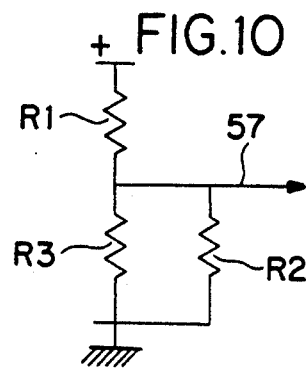
Figure 11:
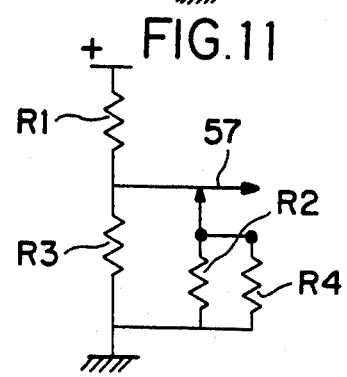

Referring now to FIGS. 7 to 11, these show the resistance values used to determine the voltages at the output terminal 56 for various positions of the cursor 11. FIG. 7 corresponds to position 4, while FIGS. 8 to 11 correspond to positions 3 to 0 respectively. As will have been gathered from the foregoing, movement from one position to another (as represented in FIGS. 8 to 11) causes a resistor to be brought into circuit or out of circuit.

It will be appreciated that the electrical circuit of the actuator has not been modified, and that the voltage generator 50 of the selector and the generator associated with the actuator may be equally made as "mirror images" of each other, by appropriate choice of the resistance values in the selector.

The contact strips 51 to 55 are part of a printed circuit, or in a modification, an engraved metallic circuit, with this circuit including connection lines for connection with the resistors R1 to R5 and being carried by the support plate 3.

It will be noted that, clearly, all the contact strips are so shaped and dimensioned as to cooperate with the cursor 11, and in particular they have a width which is greater than that of its prongs, with the axial spacings between the collecting strip, the secondary contact strips and the primary contact strips being a function of the spacing between the prongs of the cursor 11.

The present invention is of course not limited to the example described above and shown in the drawings. In particular, the number of positions may be less than five, or greater than five, and depends on the number of positions of the actuator. Thus for example, in order to obtain three positions, the collecting strip 51 is shortened and the strips 52 and 53 are omitted. If a larger number of positions is required, then a second series of secondary contact strips (or a larger number of the latter) can be added, it being understood that in each case, the length of any such additional strip is smaller than that of the corresponding primary contact strip, but greater than that of the first secondary contact strip.

Instead of employing linear movement, it is of course possible to design a device in which the contact strips are in the form of circular sectors arranged on pitch circles of different diameters, with the cursor then being arranged to move in circular motion.

In all cases, the collecting strip has an axial or circumferential length which is greater than that of the primary contact strip, the latter itself being longer than the secondary contact strip and with the cursor never joining the two primary contact strips together.

What is claimed is:

1. An electrical control selector, for controlling at least one actuator for a member movable between a plurality of discrete positions, said selector including: an electrical supply source having two terminals; a control member adapted to occupy a plurality of stable positions a switching member; means coupling said switching member to said control member whereby the switching member is movable under the action of the control member; a voltage generator for emitting voltage in a plurality of discrete values and defining two supply inputs; means connecting each said supply input to a respective one of the terminals of the supply source; a control output terminal for connection to said at least one actuator and at least one coded network comprising a plurality of resistors and a plurality of electrical contact strips associated with said resistors, said network being connected between said supply inputs and said control output terminal and being associated with said switching member, in such a way that the electrical contact strips cooperate in a coded manner with the switching member whereby a command signal is sent to the control output terminal, wherein said network includes at least one first resistor connected between the control output terminal and each of said supply inputs, at least one collecting strip connected to the control output terminal, at least one secondary contact strip connected to the control output terminal, and at least one primary contact strip connected to one of the said supply inputs, the association between said switching member and said contact strips, and the disposition and dimensioning of the contact strips being such that the switching member cooperates with the collecting strip in all of the positions, with the primary contact strip in a smaller number of the positions, and with the secondary contact strip in a still smaller number of the positions.

2. A selector according to claim 1, wherein the collecting strip extends over a greater distance than the primary contact strip, the primary contact strip extending over a greater distance than the secondary contact strip.

3. A selector according to claim 2, further including a second resistor connecting each of the contact strips comprising the collecting strip and the secondary contact strips with the control output terminal.

4. A selector according to claim 1, having two said primary contact strips, a non-conductive means separating the primary contact strips from each other, and means connecting each primary contact strip with a respective one of said supply inputs.

5. A selector according to claim 4, wherein the electrical supply source is a voltage source having a positive terminal and a negative terminal, the supply inputs comprising a first supply input connected to the positive terminal of the voltage source and a second supply input connected to the negative terminal of the voltage source, the said coded network including a third resistor connecting a first one of said primary contact strips to the first supply input, with a second one of said primary contact strips being connected to the second supply input, and with said first resistor connecting the second primary contact strip to the control output terminal.

6. A selector according to claim 5, wherein said third resistor is connected to said first resistor which connects the first supply input to the control output terminal.

7. A selector according to claim 1, wherein the switching member comprises a cursor having a plurality of prongs and being movable axially, the collecting strip being parallel to said secondary contact strip and said primary contact strip.

8. A selector according to claim 7, further including a carriage, the carriage and the control member together defining a threaded coupling for movement of the carriage by the control member, the control member being a wheel and the carriage carrying the cursor.

9. A selector according to claim 1, further including a support plate carrying the contact strips.

* * * * *